United States Patent [19]

McRae et al.

[11] Patent Number: 4,731,603
[45] Date of Patent: Mar. 15, 1988

[54] TACTILE ALARM SYSTEM FOR GAINING THE ATTENTION OF AN INDIVIDUAL

[75] Inventors: Elizabeth McRae; Cameron McKenzie, both of Glasgow, Scotland

[73] Assignee: Unisys Corporation, Blue Bell, Pa.

[21] Appl. No.: 864,534

[22] Filed: May 19, 1986

[30] Foreign Application Priority Data

Aug. 30, 1985 [GB] United Kingdom ............... 8521675

[51] Int. Cl.[4] .............................................. G08B 5/22
[52] U.S. Cl. ................................. 340/407; 340/825.46
[58] Field of Search ............... 340/407, 825.46, 311.1, 340/696, 825.44, 638, 639; 455/41

[56] References Cited

U.S. PATENT DOCUMENTS

| | | |
|---|---|---|
| 2,921,141 | 1/1960 | Enikeieff ........................ 340/311.1 |
| 3,017,631 | 1/1962 | Fink et al. ....................... 340/407 X |
| 3,601,550 | 8/1971 | Spracklen ............................ 455/41 |
| 3,623,064 | 11/1971 | Kagan . |
| 4,093,944 | 6/1978 | Muncheryan . |
| 4,180,810 | 12/1979 | Muncheryan ....................... 340/407 |
| 4,352,091 | 9/1982 | Yamasaki ........................ 340/407 X |
| 4,365,238 | 12/1982 | Kollin ............................. 340/407 X |
| 4,392,513 | 7/1983 | Ohyagi ........................... 340/825.44 |
| 4,421,953 | 12/1983 | Zielinski ..................... 340/825.46 X |
| 4,496,942 | 1/1985 | Matsuoka ........................... 340/696 |
| 4,553,138 | 11/1985 | Nakanishi et al. ............... 340/407 X |

Primary Examiner—Joseph A. Orsino
Assistant Examiner—Brian R. Tumm
Attorney, Agent, or Firm—Mark T. Starr

[57] ABSTRACT

In an alarm system for gaining the attention of an individual requiring neither sound nor light for its operation, a transmitter unit is activated to send a signal at a predetermined frequency into an induction loop to be received by a receiver unit worn on the person of the individual whose attention it is intended to gain. The transmitter unit sends its signal for at least a predetermined period and the receiver unit responds by activating a mechanical agitator of selectable frequency and amplitude to cause bodily displacement of the receiver unit in a cyclic, periodic manner.

18 Claims, 6 Drawing Figures

TACTILE ALARM SYSTEM FOR GAINING THE ATTENTION OF AN INDIVIDUAL

BACKGROUND OF THE INVENTION

The present Application relates to an alarm system for gaining the attention of an individual without use of sound or light. It particularly relates to a system for gaining the attention of an individual who for medical or other reasons is unable to hear. The present invention further relates to a system wherein the individual whose attention is to be gained need not be able to see.

The present invention is hereinafter described with reference to a door bell for use by the deaf and the deaf/blind. It is to be appreciated that the present invention is not restricted to such use. The present invention is equally applicable to situations where sound or light are not readily perceptible to the individual whose attention is to be gained. The present invention is applicable therefore to high noise environments where an individual cannot hear an alarm because of noise masking or because of being required to wear sound excluding eardefenders. The present invention is also applicable for use in the vacuum of space or in underwater situations where sound or light may not readily be transmitted to the ears of the individual whose attention is to be gained.

In attempting to provide a door bell or other selectably operable attention gaining system for a deaf person a difficulty arises in the use of a light alarm in that the person whose attention is to be gained may not at that instant be regarding the controlled light source. There is therefore a high risk of a delay or total omission in perception of the activation of the controlled light source. No light activated system can be guaranteed as effective as an acoustic system in daylight conditions and in artificial light conditions it becomes necessary to control such an unwieldy proportion of the lighting in order to be sure of gaining attention that the system becomes large and cumbersome.

In other situations alarm lights may not immediately be noticed and any associated acoustic device may be masked by excessive sound. Such a situation may occur in the cockpit of an aircraft.

Devices have been proposed which utilize an acoustic buzzer which may also provide some tactile input to a user. The low amplitude and high frequency of such tactile input renders the device ineffective to a deaf person or person not in a position to hear properly if more than a very small amount of clothing is interposed between the acoustic device and the skin of the individual whose attention is to be gained.

SUMMARY OF THE INVENTION

The desirable features of an alarm system are therefore that sufficient tactile input be provided to a non-hearing user in order rapidly to gain that user's attention in a time compatible with that which would be encountered using an acoustic alarm.

The present invention consists in an alarm system for gaining the attention of an individual, said system comprising a receiver unit operative to receive, detect and provide output indication of detection of a predetermined transmitted signal from a transmitter unit by activation of a mechanical oscillator operative to impart bodily, cyclic periodic displacement to said receiver unit.

In a preferred embodiment a system is provided comprising a static transmitter unit activated by means of a push-button to transmit a fixed frequency signal in an induction loop to be received by a receiver unit worn in or on the clothing of the individual whose attention is to be gained anywhere within the induction loop. The receiver comprises a frequency selective amplifier operating from a magnetic pickup coil, the output of the amplifier being used to drive an electric motor rotating an eccentric mass on its shaft. In the preferred embodiment the eccentric mass weighs in the region of 15 grams and has its center of mass approximately one centimeter away from the center of the motor shaft. The motor shaft preferably rotates with an angular velocity ranging between 1,000 and 4,000 rpm.

The transmitter unit preferably comprises a timer which is activated by the push-button to cause the transmitter unit to provide its predetermined transmitted signal for at least a predetermined period preferably chosen, in this instance, to be five seconds.

It is also preferred that the receiver unit be operative not only to activate the electric motor but also to provide a light output by lighting an LED whenever the motor is activated, to which end the LED is connected in series with the motor.

It is preferred that the transmitter unit comprises a buzzer which sounds whenever the push-button is depressed to indicate to the user that the signal has been sent to the individual whose attention is to be attracted.

DESCRIPTION OF THE DRAWINGS

The invention is further explained, by way of an example, by the following description read in conjunction with the appended drawings in which.

DESCRIPTION OF THE PREFERRED EMBODIMENT

Figure 1:
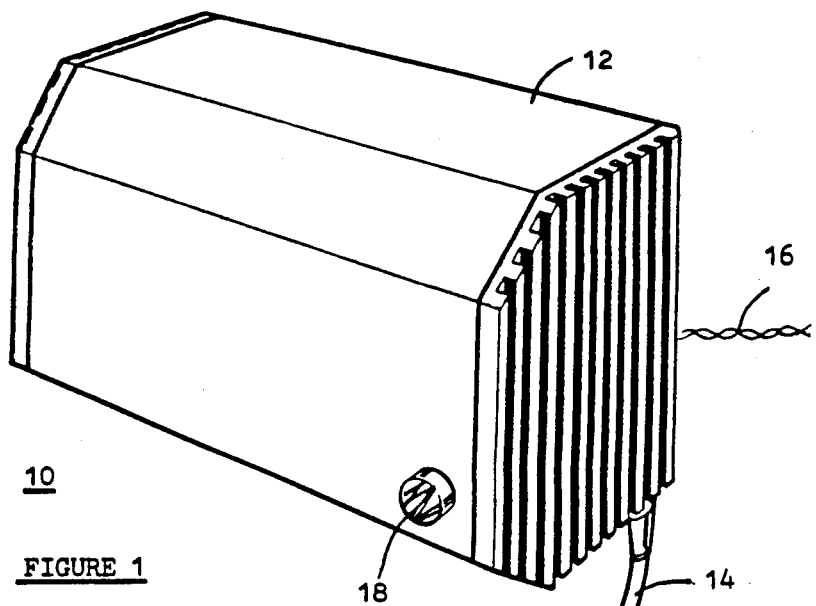
FIG. 1 shows a projected view of the transmitter unit of the present system.

FIG. 1 shows a transmitter unit 10 housed in a casing 12 and energized through a power cord 14 from the electrical supply main. The transmitter unit 10 energizes an induction loop and is coupled thereto by an induction loop connecting cable 16. The transmitter unit 10 is provided with a manually depressible push-button 18 set into its casing 12. The push-button 18 may equally well be provided at a remote location connected to the transmitter unit 10 via a cable and all that is required of the push-button 18 is that it may be accessible to a user momentarily, at least, to make a set of electrical contacts.

The transmitter unit 10 is conveniently mounted on the main door of a dwelling such that a caller may depress the push-button 18. Alternatively, the transmitter unit 10 may be placed at any convenient location within the dwelling and the push-button 18 provided remotely thereto.

Figure 2:
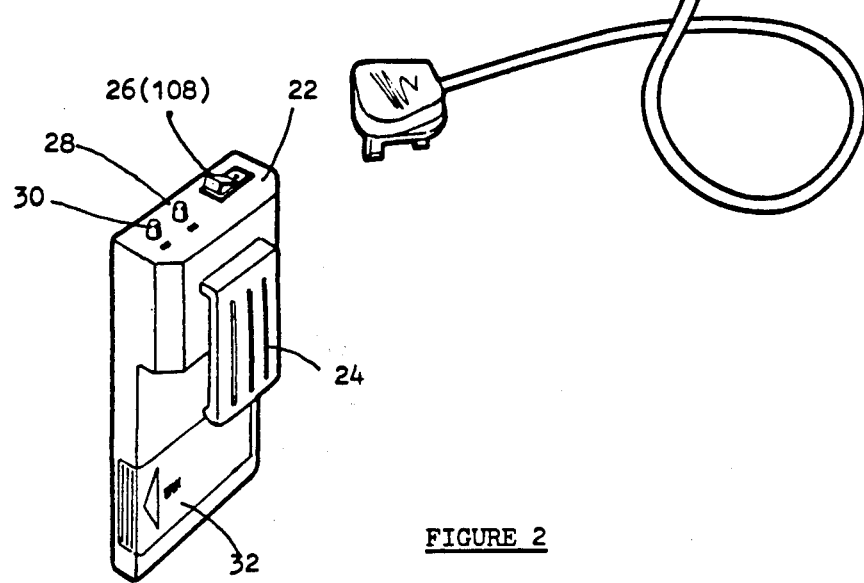
FIG. 2 shows a projected view of the receiver unit in the present system.

FIG. 2 shows the receiver unit 20 in projected view. Receiver unit 20 is provided in a receiver housing 22 having a clip 24 for attaching the receiver 20 onto the belt or in a pocket of the person or individual whose attention it is desired to attract. It is to be appreciated that other means for keeping the receiver 20 about the person whose attention is to be attracted are equally acceptable and the receiver unit 20 might equally well be slipped into, for example, a shirt pocket or jacket pocket.

An on/off switch 26 is provided so that the individual whose attention is to be attracted may activate the receiver 20 as and when he pleases. A first LED 28 is illuminated whenever the receiver 20 is in receipt of a signal from the transmitter unit 10 and a second LED 30 provides indication of sufficient battery voltage by being illuminated whenever the on/off switch 26 is in the on position. If the second LED 30 should fail to be illuminated then battery replacement in the receiver unit 20 is accomplished by removal of a battery cover 32 and replacement of the batteries therein. The batteries employed are preferably rechargeable cells recharged in an external recharging unit well-known in the art and not shown in the present Application.

Figure 3:
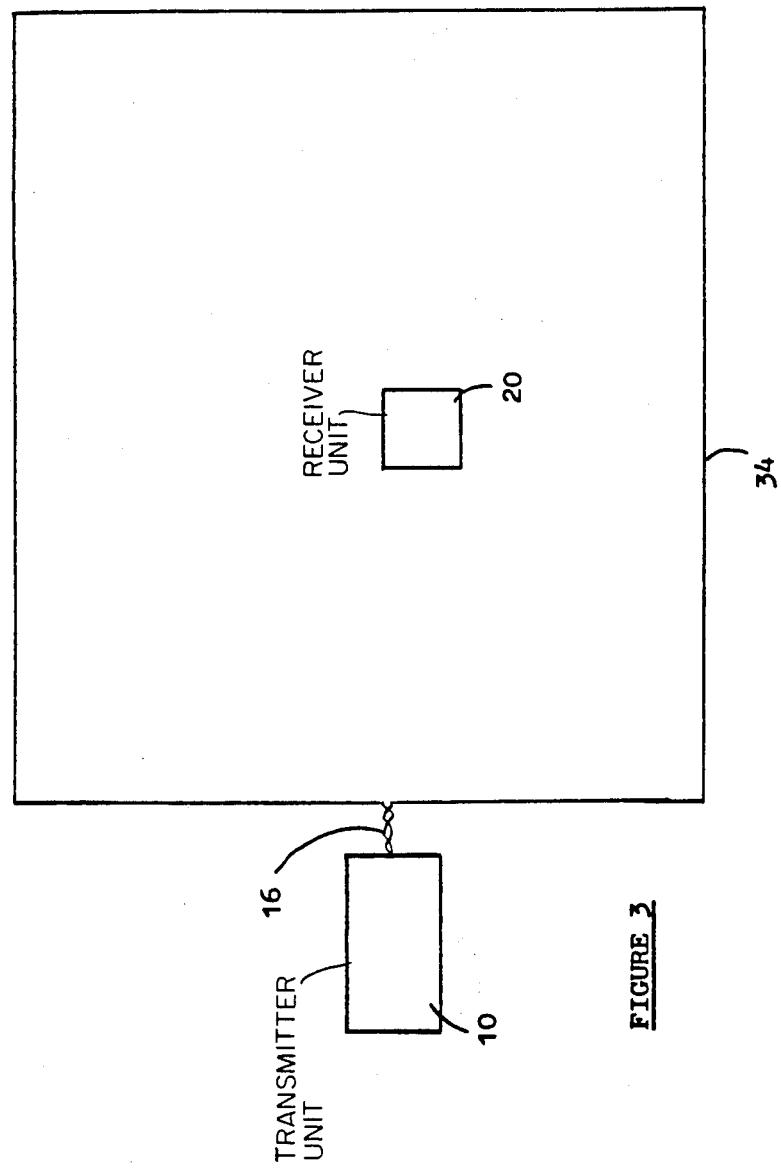
FIG. 3 shows how the transmitter unit of FIG. 1 communicates with the receiver unit of FIG. 2 by means of an induction loop.

FIG. 3 shows the manner of use of the preferred embodiment of the present invention. The induction loop connecting cable 16 connects the transmitter unit 10 to an induction loop 34. The induction loop 34 carries a high-frequency electric current and is disposed to encompass that area within which the preferred embodiment of the present invention is intended to operate. For example, the induction loop 34 may be led serially around the various rooms of a building and/or around the periphery of its garden. The induction loop 34 is a simple wire. The receiver unit 20 is operative to detect the alternating current in the induction loop 34 whenever it is within the area encompassed by the induction loop 34 and for a short distance outside of that area.

As will later become clear, the present invention may equally well operate where the transmitter unit 10 is a short range radio transmitter and the receiver unit 20 is operative to receive a short range radio wave.

Equally, within the terms of the present invention, the transmitter unit 10 may be an ultrasonic transmitter unit generating a high-frequency ultrasonic sound wave using a piezoelectric transducer and the receiver unit 20 may equally well be an ultrasonic receiver operative to detect the high frequency ultrasonic sound wave from the transmitter unit 10 to perform its function rather than detect the high-frequency alternating current in the induction loop 34.

Equally similarly, the transmitter unit 10 may be made an infrared transmitter unit. In this instance the transmitter unit 10 drives an infrared light source and the receiver unit 20 detects the infrared light.

In essence therefore, the transmitter unit 10 is required only to provide a short range broadcast signal of any type to be detected by the receiver unit 20.

Figure 4:
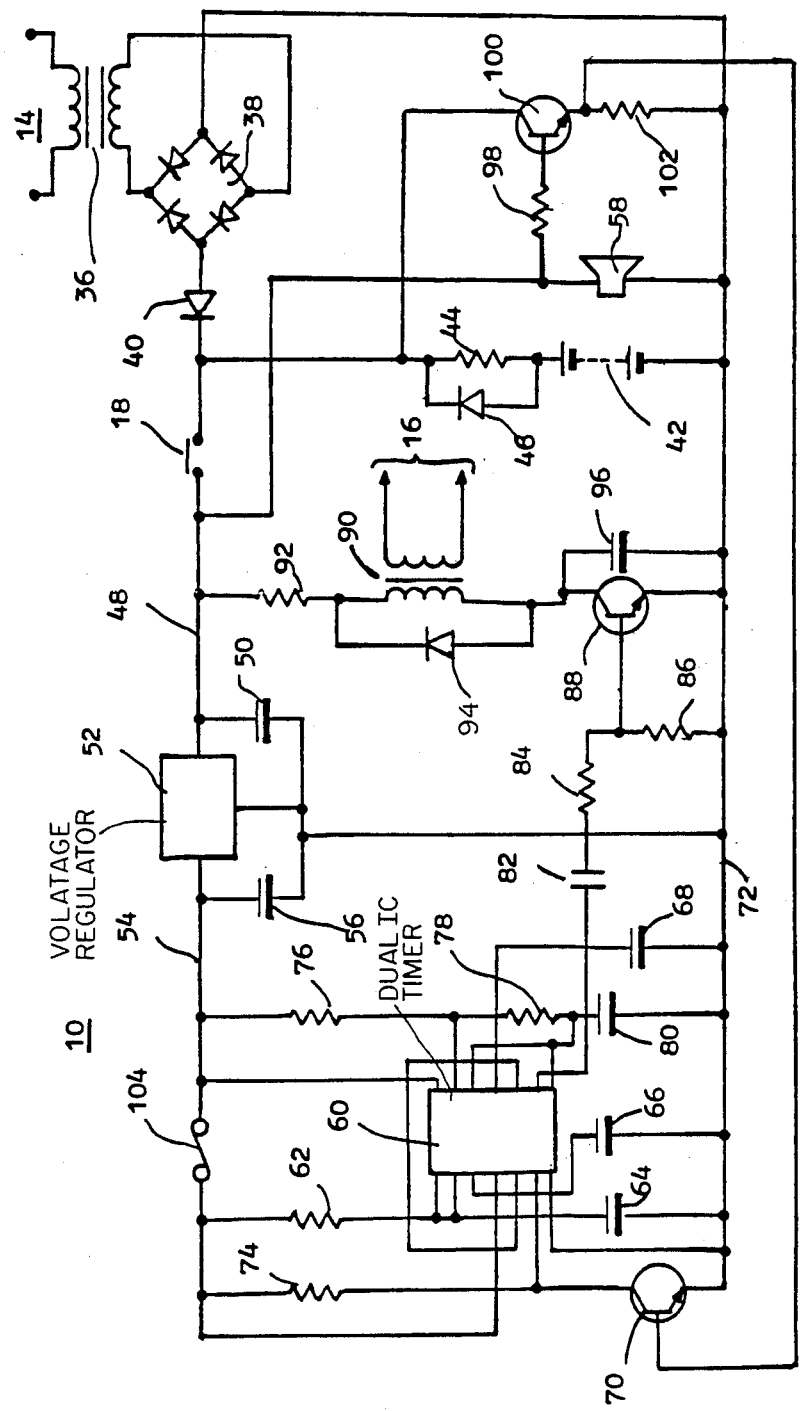
FIG. 4 shows a schematic circuit diagram of the transmitter unit of FIGS. 1 and 3.

FIG. 4 shows a schematic circuit diagram of the transmitter unit 10 otherwise shown in FIGS. 1 and 3.

The power cord 14 is coupled as input on the primary winding of a main transformer 36 whose secondary winding powers a bridge rectifier 38. The rectified output of the bridge rectifier 38 is coupled through a first diode 40 to supply energy to the transmitter unit 10. A transmitter unit battery 42 is charged through a first resistor 44 from the first diode 40. A second diode 46 is coupled in parallel with the first resistor 44 such that should the main power supply through the first diode 40 fail the transmitter unit battery 42 automatically supplies power via the second diode 46 to the transmitter unit 10.

The push-button 18 couples the power supply output whenever the push-button 18 is depressed onto a first power rail 48 here chosen to have a voltage of 12 volts. A first reservoir capacitor 50 stores electrical charge on the first power rail 48 received via the push-button 18 from the power supply.

A voltage regulator 52 accepts the 12 volt input from the first power rail 48 and provides a regulated 5 volt output onto a second power rail 54. The regulator here chosen in the exemplary preferred embodiment is a 78L05 regulator well-known in the art. It is to be appreciated that any other regulator providing the same function would equally serve in this position. It is also to be appreciated that it is possible to omit the voltage regulator 52 if less precision is required in the operation of the circuits supplied by the second power rail 54.

A second reservoir capacitor 56 stores electrical energy provided to the second power rail 54.

When the push-button 18 is depressed, raw energy from the first diode 40 and on the first power rail 48 is coupled to energize an acoustic buzzer 58 which produces an audible tone for the convenience of any hearing person using the door bell transmitter unit. The person pressing the push-button 18 thereby knows that the transmitter unit is operational. A light emitting device might similarly be used to indicate operation of the transmitter. The buzzer 58 is self energized and remains sounding for so long as sufficient voltage exists on the first power rail 48. When the push-button 18 is no longer depressed, the voltage on the first power rail 48 begins to fall under the current drain imposed by the buzzer 58 and, as will later be explained, of an output stage driving the induction loop 34.

The second power rail 54 drives a dual-integrated circuit timer 60. In the present preferred embodiment, the dual-integrated circuit timer 60 is chosen to be an NE556 dual precision timer integrated circuit as manufactured by National Semiconductor. It is to be appreciated that other timing circuits may be used in place of those shown for preference in the present example of the invention.

In FIG. 4 where the dual-integrated circuit timer 60 is an NE556 integrated circuit, the pin connections are shown with pin 1 in the top leftmost corner and the pins numbered sequentially counterclockwise such that pin 7 occurs in the bottom lefthand corner, pin 8 in the bottom righthand corner and pin 14 in the top righthand corner. These pin connections refer to the 14-pin dual-in-line version of that integrated circuit. FIG. 4 thus represents an actual connection diagram for the dual-integrated circuit timer 60.

In a first portion of the dual timer 60, a second resistor 62 (chosen in this instance to have a value of 200 kilohms) and a third capacitor 64 (here chosen to have a value of 22 microfarads) are connected to form a monostable timer having a period in the region of 5 seconds. A fourth capacitor 66 serves to stabilize a reference voltage in the dual-integrated circuit timer 60 as does a fifth capacitor 68.

A first transistor 70 is an NPN transistor coupled with its emitter on a ground rail 72 and its collector on a trigger pin of the first portion of the dual-integrated circuit timer 60. A third resistor 74 pulls up the voltage of the trigger pin on the first portion of the dual-integrated circuit timer 60 to the voltage on the second power rail 54. When the base of the first transistor 70 is driven positive with regard to the ground rail 72, the first transistor 70 begins to conduct and pulls the voltage on the trigger pin of the first portion of the dual-integrated circuit timer 60 towards the voltage on the ground rail 72 which causes the first portion of the dual-integrated circuit timer 60 to begin execution of its monostable timeout.

A second portion of the dual-integrated circuit timer 60 employs a fourth resistor 76, a fifth resistor 78 and a sixth capacitor 80 to form an astable multi-vibrator chosen in this preferred embodiment to have an oscillating frequency of 25 kilohertz. Whenever the first portion of the dual-integrated circuit timer 60 is in the course of executing its monostable timeout, the output of the first portion of the dual-integrated circuit timer 60, being coupled as a controlling input to the second portion of the dual-integrated circuit timer 60, permits the astable multivibrator in that second portion to oscillate with its predetermined frequency of 25 kilohertz. Those skilled in the art will be aware that other frequencies than 25 kilohertz may be used in this Application.

A seventh capacitor 82 couples the output of the second portion of the dual-integrated circuit timer 60 through a voltage dividing network consisting in a sixth resistor 84 and a seventh resistor 86 to drive the base of a second transistor 88 turning on the second transistor 88 whenever the output voltage from the second portion of the dual-integrated circuit timer 60 approaches the voltage on the second power rail 54.

The emitter of the second transistor 88 is connected to the ground rail. The second transistor 88 is an NPN transistor of sufficient power rating and gain to perform the function hereinafter ascribed to it. The second transistor 88 may be a simple low power device in those instances where a small induction loop 34 is to be driven and alternatively may be a high power Darlington transistor in those instances where a very large induction loop 34 is to be driven.

The collector of the second transistor 88 is coupled to drive one side of a primary winding on an output transformer 90. The second side of the primary winding of the output transformer 90 is coupled through a small value eight resistor 92 to the first power rail 48. In this instance the eighth resistor 92 is chosen to have small value of 27 ohms simply to resist damage to the second transistor 88 in the event of a failure. It is to be appreciated that if the primary winding of the output transformer 90 has of itself sufficient resistance to limit the current through the second transistor 88, then the eighth resistor 92 may not be required.

A third diode 94 is connected across the primary winding of the output transformer 90 to allow dissipation of reverse voltage spikes generated in the inductant of the output transformer 90 when the second transistor 88 is switched off.

An eighth tuning capacitor 96 is connected between the collector of the second transistor 88 and the ground rail 72 and is thereby placed in series (so far as A-C currents are concerned) with the eighth resistor 92 and the primary winding of the output transformer 90, thereby forming a tuned circuit damped by the resistance encountered in the primary winding of the output transformer 90 and the eighth resistor 92. The value of the eighth tuning capacitor 96 is chosen to cause the primary winding of the output transformer 90 to resonate at the frequency of astable oscillation of the second portion of the dual integrated circuit timer 60.

A ninth resistor 98 couples the first power rail 48 as an input to the base of a third transistor 100 which functions as an emitter follower with its collector connected directly to the power supply as provided by the first diode 40 or the transmitter unit battery 42 and with its emitter coupled to the ground rail 72 through a tenth resistor 102. The third transistor 100 is again an NPN transistor, thus acting as an emitter follower. The emitter of the third transistor 100 is coupled to drive the base of the first transistor 70. Transistors 100 and 70 cooperate to provide an input amplifier stage. Whenever the push-button 18 is depressed, the third transistor 100 is caused to provide a high output voltage on its emitter in consequence of the provision of power to the first power rail 48. The high output on the emitter of the third transistor 100 causes drive to be delivered to the base of the first transistor 70 which conducts and brings the trigger pin of the first portion of the dual-integrated circuit timer 60 towards the voltage on the ground rail 72 causing the first portion of the dual-integrated circuit timer 60 to execute its 5 second monostable timing operation and to cause the second transistor 88 to drive the induction loop 34 via a secondary winding on the output transformer 90 connected to the induction loop connecting cable.

The value of the first reservoir capacitor 50 and of the second reservoir capacitor 56 are chosen such that power is available to drive the dual-integrated circuit timer 60 and the output stage comprising the second transistor 88 for at least the 5 second period of the dual monostable timers (60) first portion. The use of the third transistor 100 permanently connected either to the power supply or the battery ensures that the first transistor 70 remains switched on for as long as the first power rail 48 has a voltage thereon in excess of 1.5 volts.

A fuze 104 is connected in the second power rail 54 to protect the first portion of the dual-integrated circuit timer 60 from excess currents due to the large value of the third capacitor 64. In the event of the fuze 104 blowing, the output of the first portion of the dual-integrated circuit timer 60 falls towards the voltage on the ground rail 72 thus enabling the second portion of the dual-integrated circuit timer 60 continuously to produce its 25 kilohertz output driving the second transistor 88 output stage. Thus, in the event of the fuze 104 failing and going open circuit, the transmitter unit 10 is forced into continuous output which, as will later be shown, has the effect of continuously attracting the attention of the individual carrying the receiver unit 20, alerting him to the fact of the existence of a failure.

The primary to secondary turns ratio of the output transformer 90 is chosen to provide the maximum output energy consistent with the operation of the second transistor 88 within its safe working area of acceptable dissipation. In order to allow the use of various different induction loops 34, the output transformer 90 may be chosen to have a selectable variety of tapped primary and secondary windings whereby an appropriate turns ratio may be selected.

Alternatively, the output stage comprising the second transistor 88 may be driven to provide a substantially constant current magnitude into the induction loop 34 in which case a variety of induction loops may be driven from the same output stage. In the preferred embodiment of the present invention where an induction loop is designed to pass around one or two rooms in an apartment, the chosen current in the induction loop is 100 milliamps.

Figure 5:
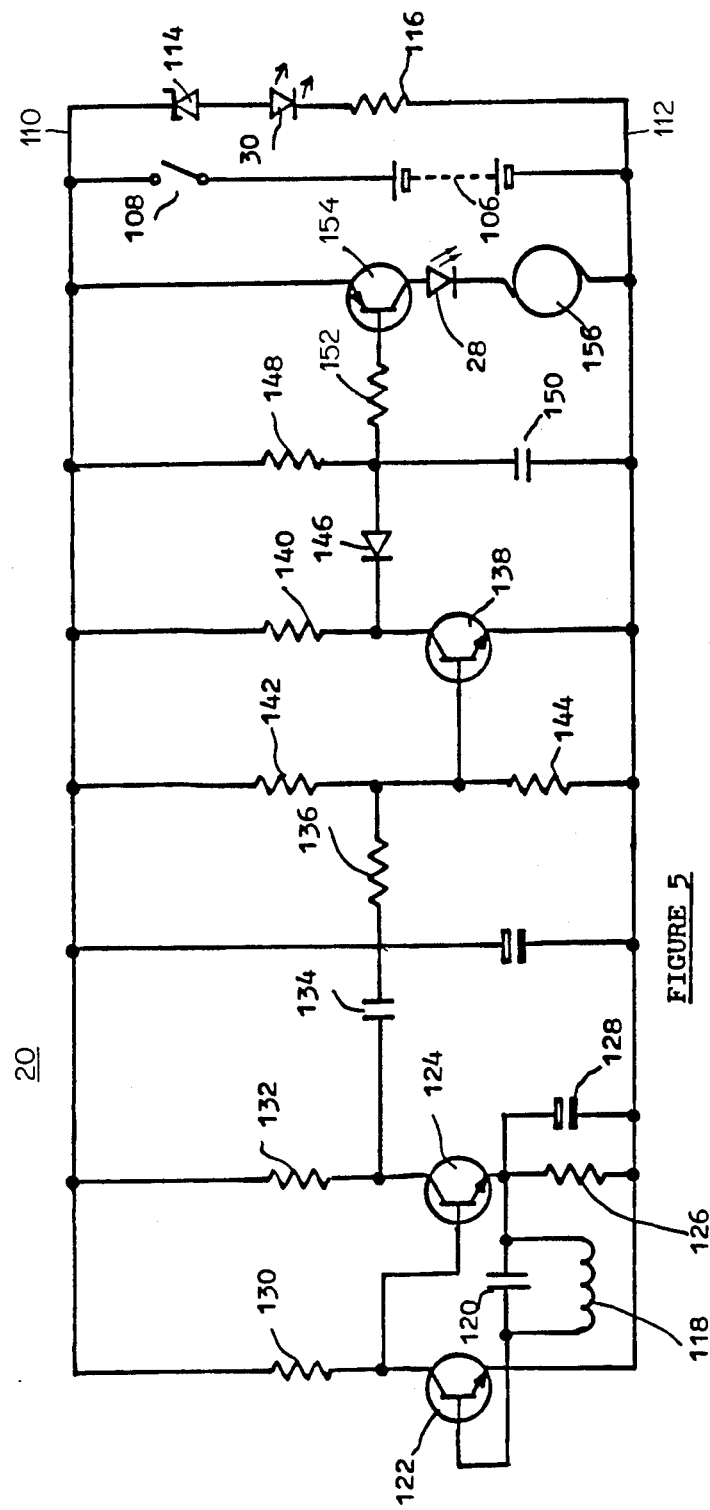
FIG. 5 shows a schematic circuit diagram of the receiver unit of FIGS. 2 and 3.

FIG. 5 shows a schematic circuit diagram of the receiver unit 20 of the present invention.

The receiver unit 20 is powered from a receiver unit battery 106 selectably connected via a switch 108 to a receiver unit power rail 110. The battery has its negative terminal connected to a receiver unit ground rail 112.

A zener diode 114 connects the receiver unit power rail 110 to the anode of the second LED 30 shown in FIG. 1 and drops a predetermined voltage (here chosen as 5.6 volts) between the receiver unit power rail 110 and the anode of the first LED 28. An eleventh resistor 116 connects the cathode of the second LED 30 to the receiver unit ground rail 112. The receiver unit battery 106 is chosen to have a voltage of 9 volts. The second LED 30 has a forward voltage drop of 1.4 volts. The zener diode 114 has a voltage drop of 5.6 volts. The zener diode 114 and the second LED 30 thus between them have a voltage drop of 7 volts leaving 2 volts to drive a current through the second LED 30 regulated by the eleventh resistor 116 whose value is chosen accordingly to provide a suitable current to provide proper illumination of the second LED 30 when the receiver unit battery 106 has a voltage of 9 volts. Thus, whenever the switch 108 is closed and the receiver unit battery 106 has a voltage in excess of 7 volts, some light should be seen to come from the second LED 30. If the second LED 30 fails to light or is very dim when the switch 108 closed, it is an indication that the receiver unit battery 106 should be removed to be recharged in an external charger.

A pickup coil 118 of large magnetic dipole moment is provided within the receiver housing 22 to generate an output voltage in response to the flow of current at the predetermined frequency of the second portion of the dual-integrated circuit timer 60 in the induction loop 34. A ninth tuning capacitor 120 tunes the pickup coil 118 to the predetermined frequency transmitted by the transmitter unit 10.

The voltage received by the pickup coil 118 (generally in the region of a few millivolts) is coupled as input to an amplifier employing fifth 122 and sixth 124 transistors (both low power NPN devices) with the pickup coil 118 in parallel with the ninth tuning capacitor 120 connected between the emitter of the fifth transistor 124 and the base of the fourth transistor 122, with the emitter of the fifth transistor 124 connected to the receiver unit ground rail 112 by a twelfth resistor 126 shunted by a tenth decoupling capacitor 128, with the collector of the fourth transistor 122 connected to the receiver unit power rail 110 by a thirteenth resistor 130, with the collector of the fourth transistor 122 connected to the base of the fifth transistor 124, and with the collector of the fifth transistor 124 being connected to the receiver unit power rail 110 by a fourteenth resistor 132, the emitter of the fourth transistor 122 being connected directly to the receiver unit ground rail 112. The fourth and fifth transistors 122, 124 thus form a D.C. stabilized high gain, low noise amplifier pair.

The output signal generated on the collector of the fifth transistor 124 is coupled by an eleventh capacitor 134 in series with a fifteenth resistor 136 to drive the base of a sixth NPN, low power transistor 138 having its emitter connected to the receiver unit ground rail 112 and its collector connected via a sixteenth resistor 140 to the receiver unit power rail 110. A bias network comprising a seventeenth resistor 142 and an eighteenth resistor 144 brings the base voltage of the sixth transistor 138 close to the point where the sixth transistor 138 commences to conduct. A small voltage applied from the output of the fifth transistor 124 thus can cause the sixth transistor 138 to commence to conduct. The fifteenth resistor 136 serves as a controllable attenuator operating into the resistance network provided by the seventeenth 142 and eighteenth 144 resistors. If desired, the fifteenth resistor 136 can be omitted.

The collector of the sixth transistor 138 experiences large voltage swings from the voltage of the receiver unit power rail 110 towards the voltage on the receiver unit ground rail 112 in response to output being provided from the collector of the fifth transistor 124. A third diode 146 has its cathode connected to the collector of the sixth transistor 138 and its anode connected to a first end of a nineteenth resistor 148 whose second end is connected to the receiver unit power rail 110. A twelfth capacitor 150 is connected between the first end of the nineteenth resistor 148 and the receiver unit ground rail to store and hold any voltage level impressed via the third diode 146 upon the first end of the nineteenth resistor 148 which co-operates with the twelfth capacitor 150 to form a smoothing circuit. The combination of the sixth transistor 138 the third diode 146, the nineteenth resistor 148, and the twelfth capacitor 150, thus forms a detector for detecting output signals provided by the fifth transistor 124 and for generating a smooth D.C. voltage in response thereto.

A twentieth resistor 152 has a first end connected to the first end of the nineteenth resistor 148 and a second end connected to the base of a seventh transistor 154. The seventh transistor 154 is a PNP device having its emitter connected to the receiver unit power rail 110 and its collector connected to the anode of the first LED 28 otherwise shown in FIG. 1. The cathode of the first LED 28 is connected to a first terminal of a motor-agitator 156 whose second terminal is connected to the receiver unit ground rail 112.

In operation, whenever the pickup coil 118 receives sufficient voltage from the induction loop 34 at the predetermined frequency set by the second portion of the dual-integrated circuit timer 60 to cause the seventh transistor 154 to commence to conduct, the first LED 28 is lit and the motor-agitator 156 begins to rotate so causing mechanical bodily cyclic and periodic displacement of the receiver unit 10. The lighting of the first LED 28 and the operation of the motor-agitator 156 continues for so long as the receiver unit 20 detects the output at the predetermined frequency from the transmitter unit 10. This output from the transmitter unit 10 persists until the first portion of the dual-integrated circuit timer 60 terminates its monostable timing operation. The motor-agitator 156 thus operates for a minimum period of at least 5 seconds no matter how briefly the push-button 18 is depressed. Thus the motor-agitator 156 operates sufficiently long to gain the attention of the individual who has the receiver unit 20 about his or her person.

Figure 6:
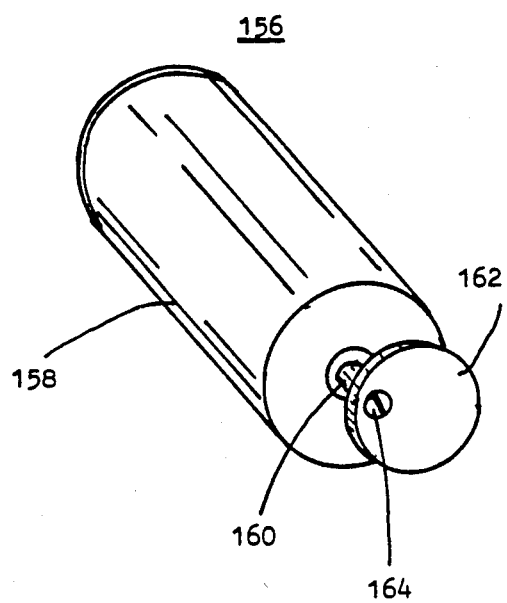
FIG. 6 shows a projected view of the electric motor mechanical oscillator employed in the receiver unit of FIGS. 2, 3 and 5.

FIG. 6 shows a projected view of a preferred motor-agitator according to the present invention. A conventional miniature electric motor 158 turns a shaft 160. The electric motor 158 is a D.C. commutator motor, though those skilled in the art will appreciate that any motor causing a shaft 160 to rotate will serve equally well. The shaft 160 has an eccentric mass 162 affixed thereto by a screw 164 or by any other means serving to allow the eccentric mass 162 to rotate with the shaft 160. Alternative embodiments allow for the shaft to run a gear chain or a belt and pulley system to rotate the eccentric mass. All that is required is that a mass be rotated about a point other than its center of gravity. In the present preferred embodiment, the eccentric mass 162 is chosen to weigh in the region of 15 grams and the voltage feedback constant of the motor 158 is chosen for the shaft 160 to rotate with an angular velocity in the range 1,000 rpm. to 4,000 rpm. The receiver unit, complete with batteries, weighs in the range of 40 to 100 grams. It is to be appreciated that while the eccentric mass 162 is here shown as being circular, any other shape achieving the effect hereinafter described will suffice. It is also to be appreciated that the mass of the eccentric mass 162 and the angular rotational speed of the shaft 160 can be chosen to achieve a greater or lesser extent of mechanical bodily cyclic periodic displacement of the receiver unit as hereinafter described.

The motor 158 is firmly affixed within the receiver unit 20 such that any force imparted to the motor 158 is also coupled to the receiver unit 20 as a whole. When the motor-agitator 156 is activated, the eccentric mass 162 causes periodic cyclic forces to be impressed upon the motor 158 in all directions parallel to the plane of rotation of the eccentric mass 162. These forces are imparted to the body of the receiver unit which is thus caused to become agitated in a cyclic manner about the person carrying the receiver unit. The attention of the person carrying the receiver unit is thus attracted whether or not he can see or hear the receiver unit 20. Depending upon the thickness of clothing expected to be worn by the user, so the amplitude of the cyclic variation can be altered to provide tactile penetration of even the thickest clothing.

As a further advantage of the invention as hereinbefore described, it is to be appreciated that a device according to FIG. 6 may be incorporated using a receiver and transmitter unit in an alarm system used in an alarm clock to cause mechanical agitation of a sleeper in addition to the usual acoustic and/or visual stimuli.

It is also to be appreciated that, whereas the transmitter unit of the present invention has been shown as being activated by operation of a push-button 18, the transmitter unit 10 may equally well be activated by any automatic electrical or electronic apparatus as in an alarm clock or to provide signalling for any other automatic or electrical/electronic apparatus in the environment of the person carrying the receiver unit. In particular, it is envisaged that an airline pilot might carry a receiver unit 20 about his person and that the receiver unit 20 be triggered in the event of an alarm light or sounder operating in the cockpit of an aircraft.

As an alternative embodiment of the motor-agitator 156 shown in FIG. 6, the present invention may equally well operate using a solenoid throwing a known mass from one end of a trajectory to another. However, the embodiment shown in FIG. 6 is preferred since it generates cyclic forces in a plane, whereas the solenoid apparatus described above generates cyclic forces only in a preferred direction. The eccentric mass may be omitted by arranging that the armature of the motor 158 itself be made unbalanced.

We claim:

1. A tactile alarm system comprising:

a transmitter unit, said transmitter unit including transmit means for generating and transmitting a predetermined transmitted signal.

said transmit means comprising monostable timer means and astable multivibrator means, alarm activator means coupled to said timer means for initiating upon activation a timeout mode in said timer means, said multivibrator means being responsive to said timeout mode for generating said predetermined transmitted signal for the period of operation of said timeout mode.

a source of electrical power coupled to a first power rail for supplying electrical energy to said transmit means, a fuze connecting said timer means to said first power rail for protecting said timer means from excess currents flowing therethrough as a result of a fault condition, the blowing of said fuze and resultant disconnection of said timer means from said first power rail causing said multivibrator means to initiate the continuous generation of said predetermined transmitted signal, thereby providing an indication of the occurrence of said fault condition.

2. A system according to claim 1 characterized in that said source of electrical power coupled to said first power rail comprises a first reservoir capacitor.

3. A system according to claim 2 further characterized in that said transmitter unit is coupled by said alarm activator to a second power rail driven by an electrical supply main, a second reservoir capacitor coupled to said second power rail for storing electrical energy from said electrical supply main in response to the activation of said alarm activator.

4. A system as defined in claim 3 further including voltage regulator means interposed between said first and second power rails, said first reservoir capacitor storing electrical energy in the form of regulated voltage supplied by said voltage regulator means.

5. A system according to claim 3 wherein said transmitter unit further comprising a battery charged by a battery charger from said electrical supply main and said battery being operative to provide power to said transmitter unit in the event of failure of said electrical supply main.

6. A system according to claim 1 comprising a receiver unit, said receiver unit including:

receiver means for receiving and detecting the receipt of said predetermined transmitted signal; and output means, responsive to the detection of said predetermined transmitted signal, for activating a mechanical oscillator operative to impart bodily, cyclic periodic displacement to said receiver unit.

7. A system according to claim 6 wherein said mechanical oscillator comprises an electric motor operative to rotate an eccentric mass.

8. A system according to claim 6 wherein said transmitter unit is an induction loop transmitter operative to provide said predetermined transmitted signal within an area encompassed by an induction loop.

9. A system according to claim 8 wherein said predetermined transmitted signal comprises a signal of a predetermined frequency.

10. A system according to claim 8 wherein said receiver unit includes illuminating means for illuminating a light whenever said mechanical oscillator is activated.

11. A system according to claim 10 wherein said alarm activator is a push-button.

12. A system according to claim 11 wherein said push-button is affixed to said transmitter unit.

13. A system according to claim 8 wherein said transmitter unit includes buzzer means for sounding a buzzer in response to said transmitter unit being activated by said alarm activator.

14. A system according to claim 8 wherein said receiver unit comprises a magnetic pickup coil.

15. A system according to claim 14 wherein said receiver unit comprises a tuning capacitor for tuning said magnetic pickup coil to said predetermined frequency.

16. A system according to claim 15 wherein said mechanical oscillator comprises an electric motor operative to rotate an eccentric mass.

17. A system according to claim 8 wherein said mechanical oscillator comprises an electric motor operative to rotate an eccentric mass.

18. A system as defined in claim 8 further characterized in that said timer means and said multivibrator means each have respective input and output terminals, input current amplifier means coupling said alarm activator means to the input terminal of said timer means, the output terminal of said timer means being coupled to the input terminal of said multivibrator means, output current amplifier means having respective input and output terminals, the output terminal of said multivibrator means being coupled to the input terminal of said output current amplifying means, an output transformer for driving said induction loop, said output transformer being coupled to the output terminal of said output current amplifying means whereby said predetermined transmitted signal generated by said multivibrator means appears on said loop.

* * * * *